United States Patent
Oztaskent et al.

(10) Patent No.: US 11,620,543 B2
(45) Date of Patent: Apr. 4, 2023

(54) IDENTIFYING PHYSICAL ACTIVITIES PERFORMED BY A USER OF A COMPUTING DEVICE BASED ON MEDIA CONSUMPTION

(71) Applicant: Google LLC, Mountain View, CA (US)

(72) Inventors: Ant Oztaskent, London (GB); Flavio Lerda, London (GB)

(73) Assignee: Google LLC, Mountain View, CA (US)

( * ) Notice: Subject to any disclaimer, the term of this patent is extended or adjusted under 35 U.S.C. 154(b) by 529 days.

(21) Appl. No.: 16/725,033

(22) Filed: Dec. 23, 2019

(65) Prior Publication Data
US 2021/0192367 A1  Jun. 24, 2021

(51) Int. Cl.
*H04N 21/442* (2011.01)
*G06N 5/04* (2023.01)
*G06N 20/00* (2019.01)
*G06F 3/0487* (2013.01)
*H04N 21/45* (2011.01)
*G06V 40/20* (2022.01)

(52) U.S. Cl.
CPC .............. *G06N 5/04* (2013.01); *G06F 3/0487* (2013.01); *G06N 20/00* (2019.01); *G06V 40/23* (2022.01); *H04N 21/44218* (2013.01); *H04N 21/44222* (2013.01); *H04N 21/4532* (2013.01); *G06V 2201/10* (2022.01)

(58) Field of Classification Search
CPC ................................................ H04N 21/44218
See application file for complete search history.

(56) References Cited

U.S. PATENT DOCUMENTS

| 2007/0271065 | A1 | 11/2007 | Gupta et al. |
| 2012/0179278 | A1 | 7/2012 | Riley et al. |
| 2013/0138386 | A1* | 5/2013 | Jain .................. G06Q 30/02 702/141 |

(Continued)

FOREIGN PATENT DOCUMENTS

| JP | H04224776 A | 8/1992 |
| JP | 2006239398 A | 9/2006 |

(Continued)

OTHER PUBLICATIONS

The Notice of Office Action, and translation thereof, from counterpart Korean Application No. 10-2020-0077833, dated Jul. 24, 2021, 11 pp.

(Continued)

*Primary Examiner* — Michael H Hong
(74) *Attorney, Agent, or Firm* — Shumaker & Sieffert, P.A.

(57) ABSTRACT

A method includes identifying, based on sensor data received by a motion sensor, a physical activity performed by a user of the computing system during a time period and determining whether the user consumed media during the time period that the user performed the physical activity. The method also includes responsive to determining that the user consumed the media during the time period that the user performed the physical activity, determining, based on data indicative of the media consumed by the user, an updated physical activity performed by the user during the time period; and outputting data indicating the updated physical activity.

20 Claims, 3 Drawing Sheets

(56) References Cited

U.S. PATENT DOCUMENTS

| | | | |
|---|---|---|---|
| 2013/0138716 A1* | 5/2013 | Macwan | G06Q 30/02 340/539.11 |
| 2013/0316316 A1 | 11/2013 | Flavell et al. | |
| 2013/0325396 A1 | 12/2013 | Yuen et al. | |
| 2014/0257534 A1 | 9/2014 | Morris et al. | |
| 2017/0062015 A1* | 3/2017 | Zuhorski | A61B 5/74 |
| 2018/0036591 A1 | 2/2018 | King et al. | |
| 2019/0180448 A1 | 6/2019 | Ro et al. | |
| 2019/0255384 A1 | 8/2019 | Bastide et al. | |
| 2019/0258671 A1 | 8/2019 | Bou et al. | |

FOREIGN PATENT DOCUMENTS

| | | | |
|---|---|---|---|
| JP | 2010139647 A | 12/2008 | |
| JP | 2013513439 A | 4/2013 | |
| JP | 2016513999 A | 5/2016 | |
| JP | 2016157196 A | 9/2016 | |
| JP | 2018098769 A | 6/2018 | |
| JP | 2018161239 A | 10/2018 | |
| KR | 1020130099418 A | 9/2013 | |
| KR | 1020170075988 A | 7/2017 | |
| KR | 1020190069684 A | 6/2019 | |
| WO | 2011071461 A1 | 6/2011 | |
| WO | 2011072111 A2 | 6/2011 | |
| WO | 2018194523 A1 | 10/2018 | |

OTHER PUBLICATIONS

Extended Search Report from counterpart European Application No. 20176594.8, dated Nov. 6, 2020, 10 pp.

Abdul et al., "An Emotion-Aware Personalized Music Recommendation System Using a Convolutional Neural Networks Approach", Applied Sciences, Jul. 8, 2018, 16 pp.

Response to First Examination Report dated Nov. 10, 2021, from counterpart Indian Application No. 202044022601 filed Feb. 15, 2022, 17 pp.

Allowance of Patent, and translation thereof, from counterpart Korean Application No. 10-2020-0077833 dated Jan. 26, 2022, 7 pp.

First Examination Report from counterpart Indian Application No. 202044022601 dated Nov. 10, 2021, 6 pp.

Notice of Grant, and translation thereof, from counterpart Japanese Application No. 2020-095307 dated Nov. 30, 2021, 9 pp.

Response to Extended Search Report dated Nov. 6, 2020, from counterpart European Application No. 20176594.8 filed Dec. 20, 2021, 25 pp.

Communication pursuant to Article 94(3) EPC from counterpart European Application No. 20176594.8 dated Aug. 4, 2022, 8 pp.

Response to Communication pursuant to Article 94(3) EPC dated Aug. 4, 2022, from counterpart European Application No. 20176594.8 filed Nov. 29, 2022, 16 pp.

* cited by examiner

IDENTIFYING PHYSICAL ACTIVITIES PERFORMED BY A USER OF A COMPUTING DEVICE BASED ON MEDIA CONSUMPTION

BACKGROUND

Some computing devices utilize accelerometers or other sensors to determine when a user is physically active and identify what physical activity the user is performing. Typically, a computing device can only determine a broad type of physical activity using data from an accelerometer, such as running, biking, or aerobic activity. Further, the computing device often incorrectly identifies physical activity performed by the user.

SUMMARY

In general, the disclosed subject matter relates to techniques for enabling a computing system to identify a physical activity performed by a user of the computing system. The computing system includes one or more sensors worn by the user that detect motion of the user and/or physiological conditions of the user. The computing system makes an initial determination of the physical activity performed by the user and a time period during which the user performed the physical activity. The computing system also includes data indicating what media the user consumed (e.g., via an internet-based media platform) and the time period during which the media was consumed. If the computing system determines that the user consumed media while also performing a physical activity, the computing system may update the physical activity based on a physical activity associated with the media. For example, the metadata for the media may indicate the media is a fitness media (e.g., workout video) for a particular physical activity (e.g., yoga). In such examples, the computing system may update a user profile for the user to indicate that the user performed the particular physical activity associated with the media.

Utilizing sensor data as well as data indicative of media consumed by the user may enable the computing system to more accurately identify the physical activities performed by the user. In some instances, utilizing data indicative of media consumed by the user may enable the computing system to identify more granular or specific types of physical activities. More accurately determining the physical activities performed by the user, or identifying more specific physical activities, may enable the computing system to more accurately assess the calories burned during the physical activity, and potentially increase the health of the user. Further, identifying the physical activities performed by the user with more accuracy and/or more specificity may improve the user experience, for example, by reducing how often the user manually adds or edits a user profile that tracks physical activities.

In one example, a method includes determining, by a computing system, a physical activity performed by a user of the computing system during a time period; determining, by the computing system, whether the user consumed media during the time period that the user performed the physical activity; responsive to determining that the user consumed the media during the time period that the user performed the physical activity, determining, by the computing system, based on data indicative of the media consumed by the user, an updated physical activity performed by the user during the time period; and outputting, by the computing system, data indicating the updated physical activity.

In another example a computer-readable storage medium is described including instructions that, when executed, cause at least one processor of a computing device to: determine a physical activity performed by a user of the computing system during a time period; determine whether the user consumed media during the time period that the user performed the physical activity; responsive to determining that the user consumed the media during the time period that the user performed the physical activity, determine, based on data indicative of the media consumed by the user, an updated physical activity performed by the user during the time period; and output data indicating the updated physical activity.

In another example, a computing system is described that includes at least one processor and a memory comprising instructions that, when executed by the at least one processor, cause the at least one processor to: determine a physical activity performed by a user of the computing system during a time period; determine whether the user consumed media during the time period that the user performed the physical activity; responsive to determining that the user consumed the media during the time period that the user performed the physical activity, determine, based on data indicative of the media consumed by the user, an updated physical activity performed by the user during the time period; and output data indicating the updated physical activity.

In another example, a system is described including means for determining a physical activity performed by a user of the computing system during a time period; determining whether the user consumed media during the time period that the user performed the physical activity; responsive to determining that the user consumed the media during the time period that the user performed the physical activity, determining, based on data indicative of the media consumed by the user, an updated physical activity performed by the user during the time period; and outputting data indicating the updated physical activity.

The details of one or more examples are set forth in the accompanying drawings and the description below. Other features, objects, and advantages of the disclosure will be apparent from the description and drawings, and from the claims.

DETAILED DESCRIPTION

Figure 1:
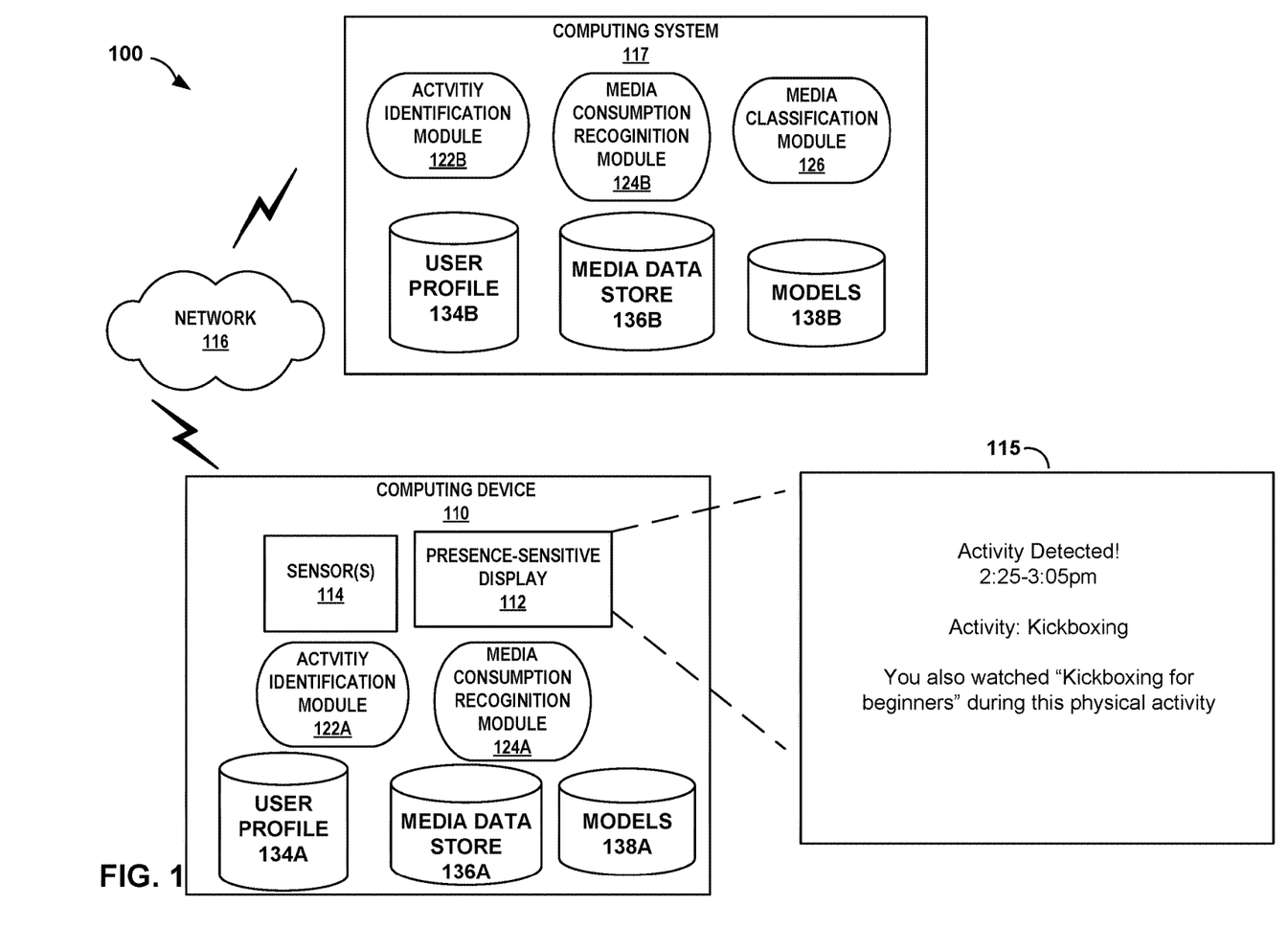
FIG. 1 is a conceptual diagram illustrating an example computing system that identifies physical activities performed by a user, in accordance with one or more aspects of the present disclosure.

FIG. 1 is a conceptual diagram illustrating an example system 100 that identifies physical activities performed by a user, in accordance with one or more aspects of the present disclosure. In the example of FIG. 1, system 100 includes computing device 110 and computing system 117 that are communicatively coupled with one another.

Computing device 110 may communication with computing system 117 via network 116. Network 116 represents any public or private communications network for transmitting data between computing systems, servers, and computing devices. Network 116 may be a wireless network (e.g., cellular, WIFI, and/or other wireless network), a wired network (e.g., a local area network (LAN), a wide area network (WAN), the Internet, etc.), or any other type of communications network. Network 116 may include one or more network hubs, network switches, network routers, or any other network equipment, that are operatively inter-coupled thereby providing for the exchange of information between computing device 110 and computing system 117. Computing device 110 and computing system 117 may transmit and receive data across network 116 using any suitable communication techniques. Computing device 110 and computing system 117 may be operatively coupled to network 116 using respective network links. The links coupling computing device 110 and computing system 117 to network 116 may be Ethernet, ATM or other types of network connections, and such connections may be wireless and/or wired connections.

Computing system 117 represents any computing system, such as one or more desktop computers, laptop computers, mainframes, servers, cloud computing systems, etc. Computing device 110 may be any type of computing device, such as a laptop computer, smartphone, tablet, smartwatch, fitness tracker (also referred to as an activity tracker or activity monitor), headphones, or any type of portable computing device. Additional examples of computing device 110 and/or computing system 117 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, or any other types of wearable and non-wearable, mobile or non-mobile computing devices.

Computing device 110 may include a presence-sensitive display (PSD) 112. PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touch-screens, pressure sensitive screens, acoustic pulse recognition touchscreens, or another presence-sensitive display technology. PSD 112 may detect input from a user of computing device 110. For example, PSD 112 may detect one or more gestures performed on or within a threshold distance of PSD 112 (e.g., a user touching PSD 112 with a finger or a stylus or moving the finger or stylus within a threshold distance of a surface of PSD 112).

PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. PSD 112 may output information (e.g., to a user) as a user interface (e.g., graphical user interface 115), which may be associated with functionality provided by computing device 110. For example, PSD 112 may display various user interfaces related to an application module or other features of computing platforms, operating systems, applications, and/or services executing at or accessible from computing device 110.

In some examples, computing device 110 includes one or more sensors 114. Sensors 114 may include one or more motion sensors configured to generate motion data indicative of motion experienced by computing device 110. Examples of motion sensors include accelerometers, gyroscopes, magnetometers, among others. Additionally or alternatively, sensors 114 may include physiological sensors configured to generate physiological data indicative of physiological conditions of the user. Examples of physiological sensors include heart rate sensors, temperature sensors, breathing sensors, sweat sensors, among others. Additionally or alternatively, sensors 114 may include sensors other than motion sensors and physiological sensors. For instance, sensors 114 may include a camera, a microphone, or any other type of sensor capable of capturing activity without necessarily being on a body of the user. Sensors 114 may output the sensor data (e.g., motion data and/or physiological data) generated by the respective sensors 114.

Computing device 110 may include activity identification module (AIM) 122A and media consumption recognition module (MCRM) 124A. Computing system 117 may include AIM 122B, MCRM 124B, and media classification module (MCM) 126. AIM 122A and AIM 122B may be collectively referred to as activity identification modules 122 or AIMs 122. Similarly, MCRM 124A and MCRM 124B may be collectively referred to as MCRMs 124. Modules 122, 124, and 126 may perform operations described using software, hardware, firmware, or a mixture of hardware, software, and firmware residing in and/or executing at computing device 110 and computing system 117. Computing device 110 and computing system 117 may execute modules 122, 124, and 126 with multiple processors or multiple devices. Computing device 110 and computing system 117 may execute modules 122, 124, and 126 as virtual machines executing on underlying hardware. Modules 122, 124, and 126 may execute as one or more services of an operating system or computing platform. Modules 122, 124, and 126 may execute as one or more executable programs at an application layer of a computing platform.

AIMs 122 may determine a physical activity performed by the user of computing device 110 based at least in part on the sensor data. Example physical activities include running, walking, yoga, kickboxing, lifting weights, swimming, among many others. In some examples, to determine a physical activity performed by the user, AIMs 122 may determine a type of physical activity (e.g., running, walking, yoga, kickboxing, lifting weights, swimming, etc.). In some examples, AIMs 122 may further determine the physical activity as a type of physical activity and one or more attributes of the type of physical activity (e.g., yoga stretches with a period of 45 seconds, jogging pace, 10 repetitions of pushups, etc.). Throughout the disclosure, examples are described where computing device 110 and/or computing system 117 analyzes data associated with computing device 110 and/or a user of computing device 110, only if computing device 110 and/or computing system 117 receives explicit permission from the user of computing device 110 to analyze the data. For example, in situations discussed below, before computing device 110 and/or computing system 117 can collect or may make use of data associated with the user, the user may be provided with an opportunity to provide input to control whether programs or features of the computing device 110 and/or computing system 117 can collect and make use of user data (e.g., information about a user's current location, movements, physiological conditions, etc.), or to dictate whether and/or how to computing device 110 and/or computing system 117 may receive content that may be relevant to the user.

In addition, certain information may be treated in one or more ways before it is stored or used by computing device 110 and/or computing system 117, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device 110 and/or computing system 117.

AIMs 122 may identify the physical activity performed by the user by applying one or more models 138A or 138B (collectively, models 138) to the sensor data. Models 138 may be trained via machine learning algorithms. Examples of machine learning algorithms include neural networks, k-nearest neighbor, support vector machines, among others. In one example, AIMs 122 may apply one or more of models 138 to the motion data and/or physiological data generated during each time period of a plurality of time periods to identify the physical activity performed by the user during the respective time period. AIMs 122 may store physical activity data indicating the physical activity performed during each time period and indicating the time period during which the physical activity was performed within user profile 134A and/or 134B (collectively, user profiles 134). In one example, AIM 122A identifies the physical activity by applying models 138A to the sensor data and stores data indicating the user performed the physical activity within user profiles 134A or 134B. In one such example, AIM 122B may determine the physical activity by receiving data from computing device 110 that indicates the physical activity and/or by querying user profiles 134A or 134B. In another example, AIM 122B receives motion data from computing device 110 and determines the physical activity by applying one or more models 138B to the motion data.

In some examples, AIMs 122 may utilize different activity recognition algorithms to identify the physical activity performed by the user of computing device 110. For instance, AIMs 122 may select an algorithm based on the media consumed. As one example, responsive to determining that a yoga video is being watches, AIMs 122 may select a yoga-specific activity detection algorithm (e.g., a yoga-specific model of models 138).

In accordance with techniques of this disclosure, computing device 110 and/or computing system 117 may determine an updated activity performed by the user during a given time period based on media consumed by the user during the time period. MCRMs 124 may determine whether the user consumed media during a time period. In some scenarios, MCRMs 124 determine that the user consumed media in response to determining that computing device 110 output media during the time period. For instance, computing device 110 may output media (e.g., a video or music) via PSD 112 and/or a speaker of computing device 110. In one example, computing device 110 may store media locally within media data store 136A. In another example, computing device 110 outputs media received from another computing device. For example, during a given time period, computing device 110 may execute a web-browser of other application and output fitness media (e.g., a workout video) streamed over the internet from a media hosting service or media content distributor (e.g., media data store 136B of computing system 117).

Additionally or alternatively, MCRMs 124 may determine whether the user consumed media output by a device other than computing device 110, such as another computing device, a television, a sound system, or any other system configured to output media. For example, the user may watch a workout video on a television (e.g., at his/her home, at the gym, etc.) or listen to music via a radio. In one example, MCRMs 124 may receive input data from an input component (e.g., PSD 112 and/or a microphone of computing device 110) and compare the input data to a fingerprint of a media file. For example, the input data may include audio input data received from a microphone of computing device 110. In such examples, MCRMs 124 may determine that the user consumed media (e.g., a song or video) during a time period in response to determining that a fingerprint of the audio input data matches a fingerprint of media that is stored in media data stores 136 (or a set of fingerprints stored in media data stores 136).

Responsive to determining the user consumed media, MCRMs 124 may update user profiles 134 to include media consumption data associated with the media. In some instances, the media consumption data includes data identifying the media (e.g., title, artist, etc.) and a time period during which the media was consumed (e.g., data indicating a start time at which computing device 110 began outputting the media and an end time at which computing device 110 ceased outputting the media).

AIMs 122 may determine whether the user of computing device 110 consumed media during the time period in which the user performed a physical activity. In one example, AIMs 122 may query user profiles 134 to determine whether the media consumption data for the user includes data indicating the user consumed media during the same time period in which the user performed a physical activity. For example, AIMs 122 may compare the start time and/or end time at which the user consumed media to the start time and/or end time at which the user performed the physical activity to determine whether at least a portion of the time overlaps. In such examples, AIMs 122 may determine that the user consumed media during the time period the user performed a physical activity in response to determining that at least a portion of the time period during which the user consumed the media overlaps the time period during which the user performed the physical activity.

Responsive to determining that the user consumed media during the time period in which the user performed the physical activity, AIMs 122 may determine an updated physical activity performed by the user based on the media consumed during the same time period. Computing system 117 and/or computing device 110 may store data associating various physical activities with various media within media data stores 136. In some examples, computing system 117 and/or computing device 110 receive data indicating the physical activities associated with a particular media from a publisher or producer of the media. As one example, a video publisher may upload video to computing system 117 and may include metadata that identifies the one or more physical activities associated with the video upon upload.

MCM 126 may automatically determine the physical activities associated with the media in response to receiving the media. For example, MCM 126 may apply one or more of models 138 (e.g., machine trained models) to the media and/or the metadata associated with the media to determine the physical activities associated with the media. Examples of metadata include the title and description of the media; author, publisher, or producer of the media; among others. Responsive to determining the physical activities associated with the media, MCM 126 may automatically associate the media with one or more physical activities. That is, MCM 126 may store data associating the media with various physical activities within media data stores 136.

In some instances, AIMs 122 determine the updated physical activity by querying media data stores 136. In one instance, the media includes a video and AIMs 122 queries media data stores 136 to determine one or more physical activities associated with the video viewed by the user during time period.

AIMs 122 may determine one or more sub-activities performed by the user based on the media consumed by the user. For example, media data stores 136 may include data associating the media with a broad activity (e.g., aerobic, running, etc.) and with at least one more granular sub-activity. In one example, the media may be associated with a broad activity of aerobic and with a plurality of sub-activities such as pushups, sit-ups, and jumping jacks, among others. In another example, the media may be associated with a broad activity of running and with a plurality of sub-activities such as a light jog, a hard job, and a sprint (e.g., in combination, referred to as a fartlek). In some instances, AIMs 122 determine the user performed each of the sub-activities associated with the media (e.g., in response to determining the user consumed the entire media). In some instances, the sub-activities are associated with respective portions of the media. In such instances, AIMs 122 may determine which of the sub-activities the user performed by determining which portions of the media the user consumed. AIMs 122 may determine, in some examples, which portions of the media the user consumed based on the media fingerprints and/or based on the timestamps of portions of the media consumed by the user. For example, the AIMs 122 may receive timestamps indicating the user watched the first thirty minutes (0:00:00 to 0:30:00) minutes of a video and determine the sub-activities associated with that portion of the video by querying media data stores 136.

Responsive to determining one or more updated physical activities associated with the media consumed by the user during a time period, AIMs 122 may output data indicating the updated physical activity. For example, AIMs 122 may output the data indicating the updated physical activity by updating the physical activity data within user profiles 134 to indicate the user performed the updated physical activity.

In some examples, AIMs 122 outputs data indicating the updated physical activity via an output device. In the example of FIG. 1, AIM 122A of computing device 110 outputs a graphical user interface (GUI) 115 via PSD 112 that includes data identifying the physical activity (e.g., kickboxing), the time period during which the user performed the physical activity, and the media consumed during the same time period.

In some examples, AIMs 122 determine one or more user health metrics based on the updated physical activity. Examples of health metrics include estimated calories burned, estimated weight, among others. For example, AIMs 122 may determine an estimated number of calories burned during the time period the user performed the updated physical activity. Determining the updated physical activity may enable to AIMs 122 to more accurately estimate the number of calories consumed by the user.

AIMs 122 may update one or more models 138 based on the sensor data and/or media consumption data. In some examples, models 138 include a machine-trained model that classifies physical activities using sensor data. In such examples, AIMs 122 may update or re-train the model that classifies physical activities based on the sensor data generated while the user performed the physical activity in response to determining the updated physical activity performed by the user.

According to some scenarios, models 138 include a machine-trained model that identifies media as fitness media. AIMs 122 may update the machine-trained model that identifies fitness media in response to determining that the user consumed media during the time period the user performed a physical activity. For example, AIMs 122 may update the media data stores 136 to indicate that the media consumed by the user during the time period is a fitness media and update or re-train the model of models 138 based on the updated data within media data stores 136 to improve the identification of media associated with physical activities by models 138. In this way, AIMs 122 may enable computing system 117 and/or computing device 110 to label or classify an individual media and update models 138 to classify additional media content. These techniques may enable identification of media being used during a workout regardless of the content of the media (e.g., regardless of whether the media is a video, song, instructional fitness video, abstract video with high beats-per-minute (BPM) soundtrack, etc.). Updating the machine trained model that identifies fitness media based on data from a large set of users may increase confidence in the classifications and enable AIMs 122 to classify the types of physical activities or the intensity of activity.

In some scenarios, the model that identifies fitness media further identifies one or more activities associated with the fitness media, as described above. In such scenarios, AIMs 122 may re-train the model that identifies the fitness media and the activities associated with such media based on the activities performed by the user while consuming the media during a given time period. In some instances, the model that identifies fitness media further identifies a start point and/or end point of a physical activity or fitness exercise in the fitness media.

In this way, the techniques of the disclosure may enable a computing system to more accurately identify physical activities performed by a user and/or identify more sub-activities physical activities. By more accurately determining physical activities performed by the user and/or determining more specific sub-activities performed by the user, the computing system may more accurately assess the calories burned during the physical activity, and potentially increase the health of the user. Further, by determining the physical activities with more accuracy and/or specificity, the computing system may reduce how often the user manually adds or edits a user profile that tracks physical activities, which may improve the user experience.

While described above as being performed by one of computing device 110 or computing system 117, any of the techniques od this disclosure may be performed at either computing device 110 or computing system 117. Similarly, in some examples, all of the techniques of this disclosure may be performed by one of computing device 110 or computing system 117.

Figure 2:
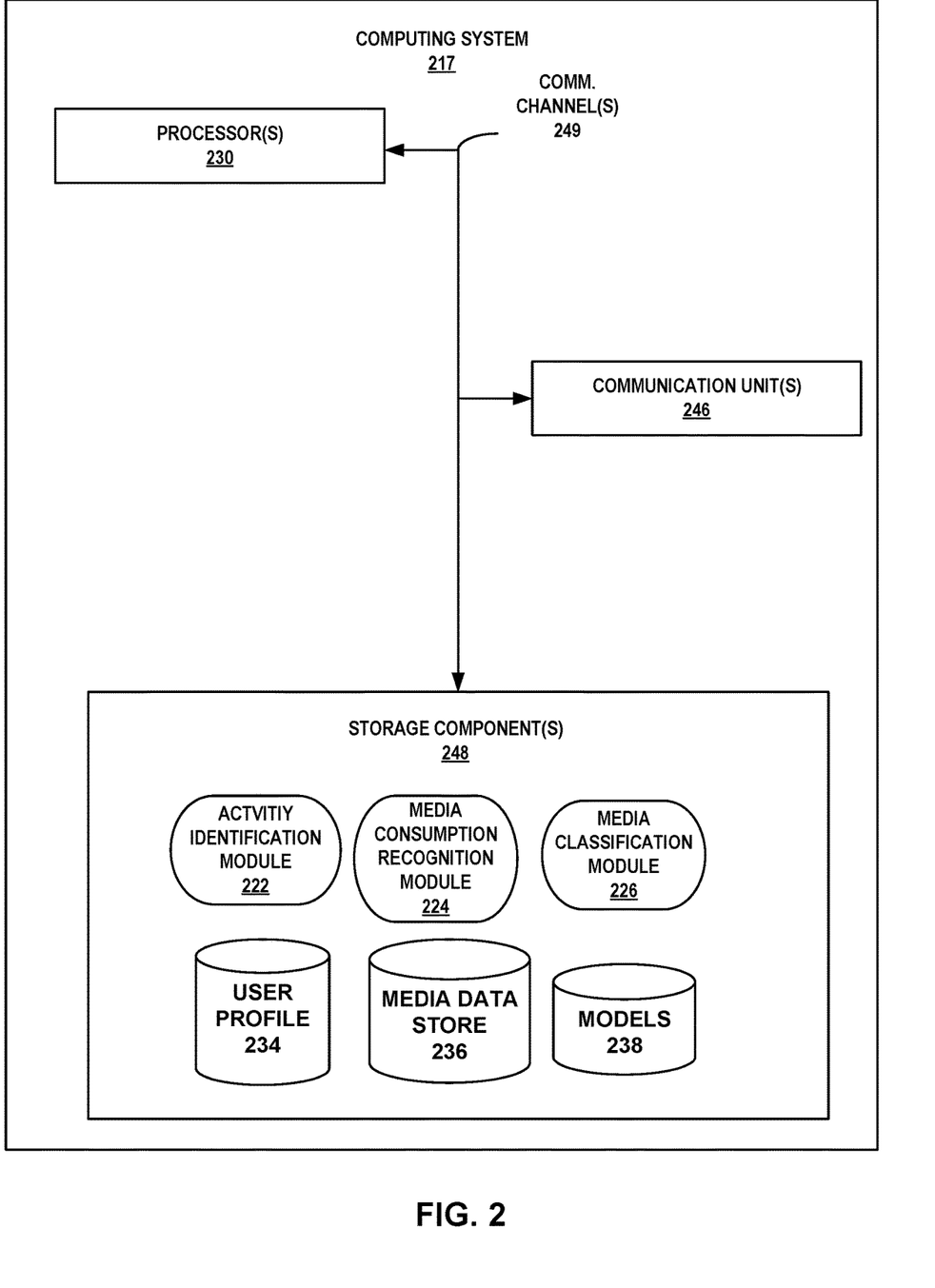
FIG. 2 is a block diagram illustrating an example computing system that identifies physical activities performed by a user, in accordance with one or more aspects of the present disclosure.

FIG. 2 is a block diagram illustrating an example computing device that determines a type of physical activity performed by a user, in accordance with one or more aspects of the present disclosure. Computing system 217 is a more detailed example of computing system 117 of FIG. 1. FIG. 2 illustrates only one particular example of computing system 217, and many other examples of computing system 217 may be used in other instances and may include a subset of the components included in example computing system 217 or may include additional components not shown in FIG. 2.

As shown in the example of FIG. 2, computing system 217 includes one or more processors 230, one or more communication units 246, and one or more storage components 248. Storage components 248 of computing system 217 include AIM 222, MCRM 224, MCM 226, user profiles 234, media data store 236, and models 238.

Communication channels 249 may interconnect each of the components 230, 246, and/or 248 for inter-component communications (physically, communicatively, and/or operatively). In some examples, communication channels 249 may include a system bus, a network connection, one or more inter-process communication data structures, or any other components for communicating data (also referred to as information).

One or more communication units 246 of computing system 217 may communicate with external devices by transmitting and/or receiving data. For example, computing system 217 may use one or more of communication units 246 to transmit and/or receive radio signals on a radio network such as a cellular radio network. In some examples, communication units 246 may transmit and/or receive satellite signals on a satellite network such as a Global Positioning System (GPS) network. Examples of communication units 246 include a network interface card (e.g. such as an Ethernet card), an optical transceiver, a radio frequency transceiver, a GPS receiver, or any other type of device that can send and/or receive information. Other examples of communication units 246 may include short wave radios (e.g., NFC, BLUETOOTH (including BLE)), GPS, 3G, 4G, 5G, and WIFI radios found in mobile devices as well as Universal Serial Bus (USB) controllers and the like.

One or more storage components 248 within computing system 217 may store information for processing during operation of computing system 217 (e.g., computing system 217 may store data accessed by modules 222, 224, and 226 during execution at computing system 217). In some examples, storage component 248 is a temporary memory, meaning that a primary purpose of storage component 248 is not long-term storage. Storage components 248 on computing system 217 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 248 may store program instructions and/or information (e.g., data) associated with modules 222, 224, and 226. Storage components 248 may include a memory configured to store data or other information associated with modules 222, 224, and 226, and user profile 234, media data store 236, and models 238.

One or more processors 230 may implement functionality and/or execute instructions associated with computing system 217. Examples of processors 230 include application processors, display controllers, auxiliary processors, one or more sensor hubs, and any other hardware configure to function as a processor, a processing unit, or a processing device. Modules 222, 224, and 226 may be operable by processors 230 to perform various actions, operations, or functions of computing system 217. For example, processors 230 of computing system 217 may retrieve and execute instructions stored by storage components 248 that cause processors 230 to perform the operations described herein that are attributed to modules 222, 224, and 226. The instructions, when executed by processors 230, may cause computing system 217 to store information within storage components 248.

AIM 222, MCRM 224, and MCM 226 may each respectively include all functionality of AIMs 122, MCRMs 124, and MCM 126 of FIG. 1 and may perform similar operations. User profile 234 may include data similar to user profiles 134 of FIG. 1. Similarly, models 238 may include data similar to models 138 of FIG. 1.

In some examples, computing system 217 may store media in media data store 236. For example, computing system 217 may receive media from a media publisher or producer of media and host the media in media data store 236. As one example, computing system 217 may include a media hosting service and may output the media from media data store 236 to other computing devices (e.g., computing device 110 of FIG. 1) to allow the users of the computing devices to consume the media.

In some examples, MCM 226 determines one or more physical activities associated with media. For example, MCM 226 may receive data indicating the physical activities associated with the media from the media publisher or producer. In another example, one or more of models 238 may be trained to identify activities associated with media (e.g., in addition to being trained to determine whether the media includes fitness media). In such examples, MCM 226 may apply one of models 238 to the media and/or metadata associated with the media to identify one or more physical activities associated with the media. A physical activity may be associated with the media when the media demonstrates a physical activity or instructs a user to perform the physical activity. Responsive to determining the physical activities associated with the media, MCM 226 may automatically associate the media with one or more physical activities within media data store 236.

MCRM 224 may determine whether a user consumed media. MCRM 224 may analyze data associated with the user and/or a computing device (e.g., computing system 217 and/or computing device 117 of FIG. 1) associated with the user to determine whether the user consumed media only if MCRM 224 receives explicit user permission to analyze the data. In one example, MCRM 224 determines the user consumed media in response to outputting media to a computing device associated with the user, such as computing device 110 of FIG. 1. For example, a user of computing device 110 may be logged into computing system 217 and computing system 217 may update a user profile 234 associated with the user to indicate the user consumed media in response to outputting the media to computing device 110. In some examples, MCRM 224 updates user profile 234 with data identifying the media consumed by the user and a time period during which the user consumed the media (e.g., time of day at which computing device 110 began outputting the media and the time of day at which computing device 110 ceased outputting the media). In some instances, MCRM 224 determines which portions of the media were consumed by the user by determining which portions of the media were output to computing device 110. In such instances, MCRM 224 may store data indicating the portion of the media consumed by the user within user profile 234.

Computing system 217 may determine a physical activity performed by the user based at least in part on media consumed by the user. Computing system 217 may analyze data associated with the user and/or a computing device (e.g., computing system 217 and/or computing device 117 of FIG. 1) associated with the user to determine the physical activity performed by the user only if computing system 217 receives explicit user permission to analyze the data. In some examples, computing system 217 makes an initial determination of a physical activity performed by the user based on data received from another computing device (e.g., computing device 110) and makes an updated determination of the physical activity based on the media consumed by the user. In one example, computing system 217 receives sensor data generated by one or more sensors of computing device 110 and initially determines the physical activity based on the sensor data. For example, models 238 may include one or more models trained to identify physical activities using sensor data and computing system 217 may apply the models trained to identify physical activities to the sensor data. In such examples, computing system 217 may store physical activity data indicating the physical activity performed by the user and the time period during which the user performed the activity (e.g., start time and end time) within user profile 234.

In another example, computing device 110 may identify the physical activity performed by the user and may output an indication of the physical activity and time during which the user performed the physical activity to computing system 217. Computing system 217 may store physical activity data indicating the physical activity performed by the user and the time period during which the user performed the physical activity within user profile 234. In such examples, computing system 217 may determine the physical activity performed by the user by querying user profile 234.

According to some scenarios, AIM 222 determines whether the user consumed media during a time period in which the user performed a physical activity. In some examples, AIM 222 may analyze media consumption data and physical activity data associated with the user only if AIM 222 receives explicit user permission to analyze media consumption data and physical activity data together. AIM 222 may periodically or continuously determine whether the user consumed media during the time period the user performed the physical activity. In one example, AIM 222 may query user profile 234 to compare the time periods during which the user performed a physical activity to the time period during which the user consumed media. For example, AIM 222 may compare the start time and/or end time at which the user consumed media to the start time and/or end time at which the user performed the physical activity to determine whether at least a portion of the time overlaps. AIM 222 may determine that the user consumed media during the time period the user performed a physical activity in response to determining that at least a portion of the time period during which the user consumed the media overlaps the time period during which the user performed the physical activity.

In some examples, AIM 222 determines whether the media is a fitness media. AIM 222 may determine whether the media is fitness media by querying media data store 236. Media data store 236 may include data indicating whether each respective media within media data store 236 includes fitness media. Fitness media may include media that demonstrates one or more physical activities and/or instructs a user in performing the physical activities. In one example, computing system 217 receives the data indicating whether the media includes fitness media from the media publisher or producer. In another example, MCM 226 determine whether the media includes fitness media based on one or more models 238. For example, models 238 may include a machine trained model trained to identify fitness media. As one example, MCM 226 may apply one or more machine trained models 238 to the media and/or metadata associated with the media to determine whether a given media includes fitness media. Responsive to receiving data indicating whether a given media includes fitness media or determining that the media includes fitness media based on models 238, MCM 226 may store data indicating that the given media includes fitness media within media data store 236.

Responsive to determining that the user consumed fitness media during the time period in which the user performed the physical activity, AIM 222 may determine an updated physical activity performed by the user based on the media consumed during the same time period. In some instances, AIM 222 determine the updated physical activity by querying media data stores 236 to determine a physical activity associated with the fitness media consumed by the user. In one instance, the media includes a video and AIM 222 queries media data stores 236 to determine one or more physical activities associated with the video viewed by the user during time period.

In some instances, AIM 222 determines the updated physical activity by determining one or more sub-activities performed by the user. For instance, media data stores 236 may include data associating the fitness media with a broad activity (e.g., aerobic, running, etc.) and with at least one more granular sub-activity. In one instance, AIM 222 determines one or more sub-activities the user performed by determining which portions of the fitness media the user consumed and querying media data store 236 to determine the sub-activities associated with those portions of the fitness media.

In some examples, AIM 222 makes an initial determination of the physical activity performed by the user based on the media (e.g., fitness media) consumed by the user. That is, in some examples, rather than a computing device initially determining the physical activity based on sensor data and then updating the physical activity based on the media consumed by the user, AIM 222 may initially determine the physical activity performed by the user during a given time period based on the user's media consumption even when a computing device did not detect motion indicative of the physical activity during the given time period.

AIM 222 may determine whether user profile 234 includes physical activity data indicating the user performed a physical activity during a time period that the user consumed media. In some examples, user profile 234 may not include data indicating the user performed a physical activity if the user was not wearing a computing device that includes a motion sensor configured to detect motion of the user (e.g., computing device 110 of FIG. 1, such as a tracker or smartwatch) or if the computing device did not detect motion indicative of a physical activity. In one example, computing system 217 stores data indicating the user was not wearing a computing device configured to detect motion of the user within user profile 234. For example, computing device 110 of FIG. 1 may determine the user was not wearing computing device 110 in response to determining it cannot detect a pulse or cannot detect electrodermal activity (e.g., galvanic skin response) and may transmit data indicating the user was not wearing computing device 110 to computing system 217.

In some scenarios, responsive to determining that the user consumed media during a given time period, AIM 222 queries user profile 234 to determine whether the physical activity data for the user within user profile 234 includes data indicating the user performed a physical activity during the same time period. For example, AIM 222 may compare the start time and/or end time at which the user consumed media to the start time and/or end time at which the user performed the physical activity to determine whether at least a portion of the time overlaps. AIM 222 may determine that user profile 234 does not include data indicating the user performed a physical activity during the time period that the user consumed media in response to determining that the time periods associated with activities performed by the user does not overlap the time period during which the user consumed media.

In some examples, AIM 222 may output data (e.g., a GUI) to another computing device (e.g., computing device 110) prompting the user to confirm whether the user performed the physical activity during the time period that the user consumed media but for which the physical activity data does not include data indicating the user performed a physical activity. In one example, AIM 222 outputs the GUI in response to determining that the media consumed by the user during the time period is fitness media. In some instances, AIM 222 outputs the GUI in response to determining that the user was not wearing a computing device that includes a motion sensor configured to detect motion of the user. For instance, AIM 222 may query user profile 234 to determine that the user was not wearing computing device 110 during the time period. In such instances, AIM 222 may increase the accuracy of the physical activity data, for example, if the user forgot to wear a fitness tracker or smartwatch.

AIM 222 may receive data indicative of a user input indicating that the user did perform a physical activity during the time period the user consumed the media. For example, computing device 110 of FIG. 1 may receive a user input indicating the user performed the physical activity during that time period, and may output data indicating the user performed the physical activity to computing system 217. In such examples, AIM 222 may update the physical activity data within user profile 234 to indicate the user performed the physical activity during the time period that the user consumed the media.

Responsive to initially determining one or more physical activities performed by the user and/or updating a determination of one or more physical activities performed by the user, AIM 222 may output data indicating the physical activity. In one example, AIM 222 outputs data indicating physical activity via an output device. For example, AIM 222 may output a GUI that includes data identifying the physical activity, the time period during which the user performed the physical activity, and/or the media consumed during the same time period.

AIM 222 may output a notification to another computing device (e.g., computing device 110) in response to determining that the user is consuming fitness media. For example, AIM 222 may output a notification to computing device 110 causing AIM 122A of FIG. 1 to apply one or more models 138A to detect physical activities performed by the user. By outputting a notification to another device, the notification may be used as an extra signal to a machine-trained model that identifies physical activities to assist computing device 110 in detecting physical activities.

Figure 3:
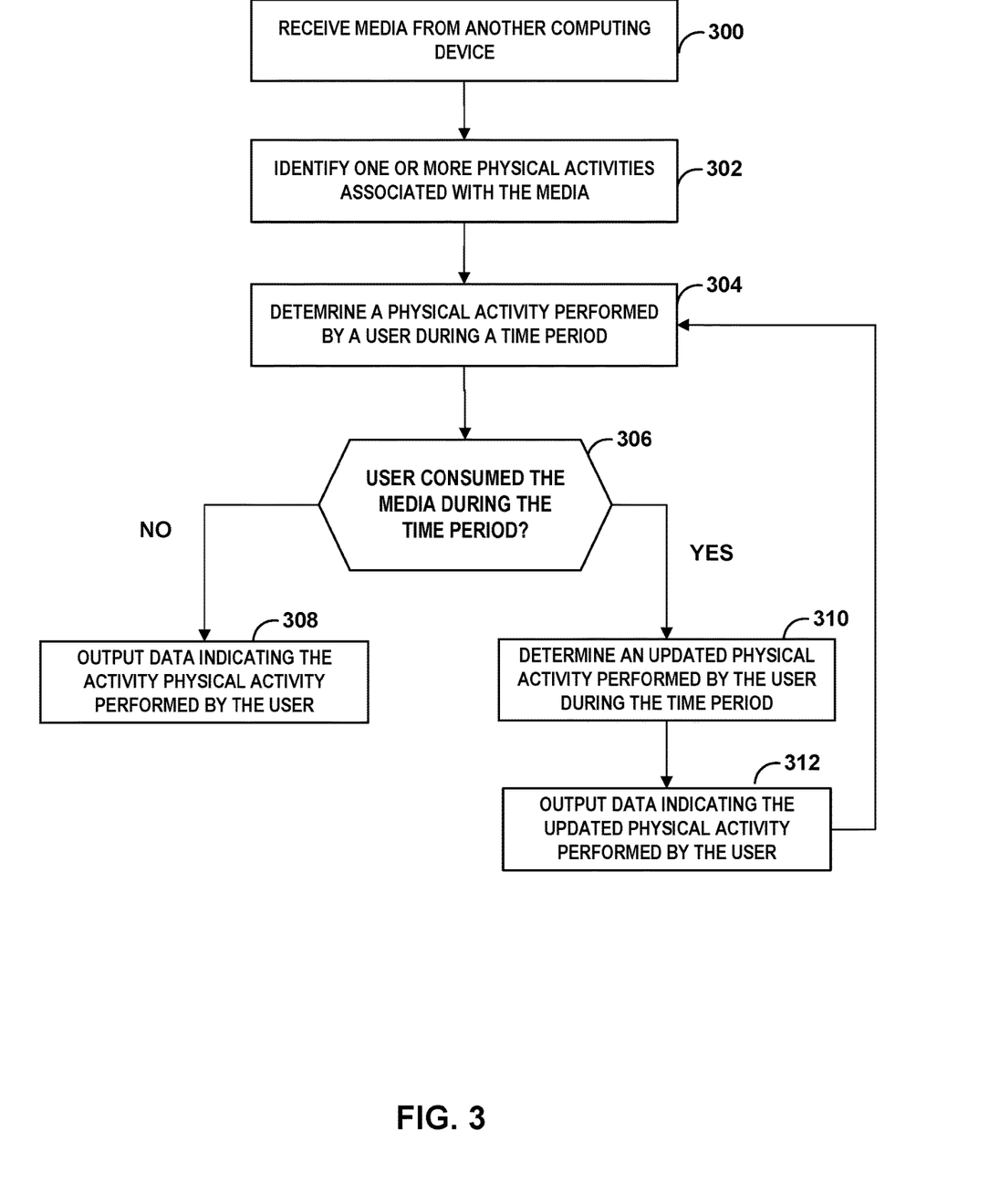
FIG. 3 is a flowchart illustrating example operations performed by an example computing system that identifies physical activities performed by a user, in accordance with one or more aspects of the present disclosure.

FIG. 3 is a flowchart illustrating example operations performed by an example computing system that that identifies physical activities performed by a user, in accordance with one or more aspects of the present disclosure. FIG. 3 is described in the context of FIG. 1.

Computing system 117 may receive media from another computing device (300). The other computing device may be associated with a media producer or publisher. For example, computing system 117 may host media in media data store 136B and may transmit (e.g., stream) the media to other computing devices.

In some examples, computing system 117 identifies one or more physical activities associated with the media (302). For example, computing system 117 may include a machine trained model within models 138B that is trained to identify physical activities. In one example, computing system 117 applies one of models 138B to metadata associated with the media and/or the media itself to identify the physical activities associated with the model.

Computing system 117 determines a physical activity performed by a user during a time period (304). In some examples, computing system 117 may analyze data associated with the user and/or a computing device (e.g., computing system 117 and/or computing device 117 of FIG. 1) associated with the user to determine the physical activity performed by the user only if computing system 117 receives explicit user permission to analyze the data. In some examples, computing system 117 receives physical activity data indicating physical activities performed by the user from another computing device (e.g., computing device 110) and stores the physical activity data in user profile 134B. For example, computing device 110 may initially identify an activity performed by the user based on sensor data generated by one or more sensors of computing device 110. In one example, computing system 117 determines the physical activity performed by the user by querying user profile 134B. In another example, computing device 110 outputs the sensor data indicative of the physical activity to computing system 117, such that computing system 117 determines the physical activity based on the sensor data. In some examples, computing system 117 may analyze the sensor data in real time or near real time to determine the physical activity. For instance, computing system 117 may determine the physical activity live. In some examples, computing system 117 may analyze the sensor data at a later time to determine the physical activity. For instance, computing system 117 may determine the physical activity post facto.

According some scenarios, computing system 117 determines whether the user consumed media during the time period that the user performed the physical activity (306). In some examples, computing system 117 may analyze physical activity data and media consumption data associated with the user and/or a computing device (e.g., computing system 117 and/or computing device 117 of FIG. 1) associated with the user only if computing system 117 receives explicit user permission to analyze such data. In one example, computing system 117 outputs the media to computing device 110 or another device associated with the user of computing device 110. In such examples, computing system 117 may store media consumption data identifying the media consumed by the user and a time period during which the user consumed the media (e.g., the time at which computing system 117 began transmitting the media to the computing device associated with the user and the time at which computing system 117 ceased transmitting the media). In another example, computing system 117 may receive media consumption data from a computing device associated with the user and store the media consumption data within user profile 134B.

Computing system 117 may compare the time periods during which the user performed a physical activity to the time period during which the user consumed media. For example, computing system 117 may compare the start time and/or end time at which the user consumed media to the start time and/or end time at which the user performed the physical activity to determine whether at least a portion of the time overlaps. Computing system 117 may determine that the user consumed media during the time period the user performed a physical activity in response to determining that at least a portion of the time period during which the user consumed the media overlaps the time period during which the user performed the physical activity.

In some examples, computing system 117 outputs data indicating the physical activity performed by the user (308) in response to determining that the user did not consume media during the time period ("NO" path of 306). For example, computing system 117 may output a GUI indicating the activity performed by the user, the time period during which the user performed the activity, an estimated number of calories consumed during the time period, or a combination thereof.

Computing system 117 may determine an updated physical activity performed by the user during the time period (310) in response to determining that the user consumed media during the time period ("YES" path of 306). For example, computing system 117 may query media data store 136B to determine one or more physical activities associated with the media. In some instances, computing system 117 determines an updated physical activity by determining one or more sub-activities performed by the user. For instance, computing system 117 may determine which sub-activities the user performed by determining which portions of the media the user consumed and querying media data store 136B to determine the sub-activities associated with those portions of the media.

Responsive to determining the updated physical activity performed by the user during the time period, computing system 117 may output data indicating the updated physical activity performed by the user (312). For example, computing system 117 may output a GUI indicating the updated activity performed by the user, the time period during which the user performed the activity, an estimated number of calories consumed during the time period, or a combination thereof. In some instances, computing system 117 may output data indicating the updated type of activity to cause another computing device to store data indicating the updated type of activity within a user profile. For instance, computing system 117 may output data indicating the updated type of activity to computing device 110 to cause computing device 110 to store the data within user profile 134A.

In some examples, in addition to or as opposed to outputting the data indicating the updated physical activity performed by the user, computing system 117 may output data suggesting an edit of activity data. For instance, computing system 117 may output a GUI suggesting that the user change an entry in their user profile (e.g., activity log) to reflect the updated physical activity. For instance, if an entry in the user profile indicates that the user performed a physical activity during time period A and computing system 117 determines that the user was running during time period A, computing system 117 may output a GUI with a prompt asking the user to confirm that they were in fact running during time period A.

The following numbered examples may illustrate one or more aspects of the disclosure:

Example 1. A method comprising: determining, by a computing system, a physical activity performed by a user of the computing system during a time period; determining, by the computing system, whether the user consumed media during the time period that the user performed the physical activity; responsive to determining that the user consumed the media during the time period that the user performed the physical activity, determining, by the computing system, based on data indicative of the media consumed by the user, an updated physical activity performed by the user during the time period; and outputting, by the computing system, data indicating the updated physical activity.

Example 2: The method of claim 1, wherein the media consumed by the user includes a video viewed by the user, and wherein determining the updated physical activity comprises: determining, by the computing system, a physical activity associated with the video viewed by the user during the time period; and determining, by the computing system, that the updated physical activity performed by the user during the time period includes the physical activity associated with the video that was viewed by the user during the time period.

Example 3: The method of any one of examples 1-2, wherein determining the updated physical activity comprises: determining, based on the data indicative of the media, for a plurality of portions of the media, a sub-activity performed by the user during respective portions of the plurality of portions of the media.

Example 4: The method of any one of examples 1-3, wherein determining the physical activity performed by the user comprises determining, by the computing system, based on a machine-trained model that classifies physical activities using sensor data received from a motion sensor, the physical activity performed by the user, wherein the method further comprises: responsive to determining the updated activity performed by the user, updating, by the computing system, based on the sensor data received and the updated activity, the machine-trained model.

Example 5: The method of any one of examples 1-4, wherein the time period is a first time period, the media is a first media, and the physical activity is a first physical activity, the method further comprising: determining, by the computing system, that the user consumed a second media during a second time period, the second media being associated with a second physical activity; determining, by the computing system, whether the computing system includes data indicating the user performing the second physical activity during the second time period; responsive to determining that the computing system does not include data indicating the user performed the second physical activity during the second time period, outputting, for display, a graphical user interface prompting the user to confirm whether the user performed the second physical activity; and responsive to receiving data indicative of a user input indicating that the user performed the second physical activity, updating, by the computing system, a user profile associated with the user to indicate the user performed the second physical activity during the second time period.

Example 6: The method of example 5, wherein outputting the graphical user interface prompting the user to confirm whether the user performed the second physical activity is further responsive to determining that the user was not wearing a wearable computing device that includes a motion sensor.

Example 7: The method of any one of examples 1-6, wherein outputting the data indicating the updated physical activity includes outputting data indicating the media consumed by the user during the time period that the user performed the updated physical activity.

Example 8: The method of any one of examples 1-7, wherein the computing system includes a user profile indicating, for each media of a plurality of media consumed by the user, a time period during which the user consumed the respective media, and wherein determining whether the user consumed media during the time period the user performed the physical activity comprises: querying, by the computing system, the user profile to determine whether the user profile includes data indicating media consumed by the user during the time period that the user performed the physical activity.

Example 9: The method of any one of examples 1-8, wherein determining whether the user consumed media during the time the user performed the physical activity comprises: determining, by the computing system, based on audio input data captured by a microphone and a set of fingerprints that are each associated with a respective media, whether the user consumed media during the time period that the user performed the physical activity.

Example 10: The method of any one of examples 1-9, further comprising: identifying, by the computing system, one or more physical activities associated with the media by applying a machine trained model to at least one of the media or metadata for the media.

Example 11: The method of any one of examples 1-11, further comprising: responsive to determining that the user consumed the media during the time period that the user performed the physical activity, updating, by the computing system, based on the media consumed by the user during the time period that the user performed the physical activity, a machine-trained model that identifies fitness media.

Example 12: The method of example 11, wherein the media consumed by the user includes a video viewed by the user, and wherein the machine-trained model that identifies fitness media further identifies an activity associated with the video.

Example 13: A computing device comprising: at least one processor; and memory comprising instructions that, when executed by the at least one processor, cause the at least one processor to perform the method of any one of examples 1-12.

Example 14: A computing system comprising means for performing the method of any one of examples 1-12.

Example 15. A computer-readable storage medium comprising instructions that, when executed by at least one processor of a computing device, cause the at least one processor to perform the method of any one of examples 1-12.

In one or more examples, the functions described may be implemented in hardware, hardware and software, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    determining, by a computing system, a physical activity performed by a user of the computing system during a time period;
    determining, by the computing system, whether the user consumed media during the time period that the user performed the physical activity;
    responsive to determining that the user consumed the media during the time period that the user performed the physical activity, determining, by the computing system, based on data indicative of the media consumed by the user, an updated physical activity performed by the user during the time period; and
    outputting, by the computing system, data indicating the updated physical activity.

2. The method of claim 1, wherein the media consumed by the user includes a video viewed by the user, and wherein determining the updated physical activity comprises:
    determining, by the computing system, a physical activity associated with the video viewed by the user during the time period; and
    determining, by the computing system, that the updated physical activity performed by the user during the time period includes the physical activity associated with the video that was viewed by the user during the time period.

3. The method of claim 1, wherein determining the updated physical activity comprises:
    determining, based on the data indicative of the media, for a plurality of portions of the media, a sub-activity performed by the user during respective portions of the plurality of portions of the media.

4. The method of claim 1,
    wherein determining the physical activity performed by the user comprises determining, by the computing system, based on a machine-trained model that classifies physical activities using sensor data received from a motion sensor, the physical activity performed by the user, and
    wherein the method further comprises, responsive to determining the updated activity performed by the user, updating, by the computing system, based on the sensor data received and the updated activity, the machine-trained model.

5. The method of claim 1, wherein the time period is a first time period, the media is a first media, and the physical activity is a first physical activity, the method further comprising:
    determining, by the computing system, that the user consumed a second media during a second time period, the second media being associated with a second physical activity;
    determining, by the computing system, whether the computing system includes data indicating the user performed the second physical activity during the second time period;
    responsive to determining that the computing system does not include data indicating the user performed the second physical activity during the second time period, outputting, for display, a graphical user interface prompting the user to confirm whether the user performed the second physical activity; and
    responsive to receiving data indicating that the user performed the second physical activity, updating, by the computing system, a user profile associated with the user to indicate the user performed the second physical activity during the second time period.

6. The method of claim 1, wherein outputting the data indicating the updated physical activity includes outputting data indicating the media consumed by the user during the time period that the user performed the updated physical activity.

7. The method of claim 1, wherein the computing system includes a user profile indicating, for each media of a plurality of media consumed by the user, a time period during which the user consumed the respective media, and wherein determining whether the user consumed media during the time period the user performed the physical activity comprises:
    querying, by the computing system, the user profile to determine whether the user profile includes data indicating media consumed by the user during the time period that the user performed the physical activity.

8. The method of claim 1, wherein determining whether the user consumed the media during the time the user performed the physical activity comprises:
    determining, by the computing system, based on audio input data captured by a microphone and a set of fingerprints that are each associated with a respective media, whether the user consumed the media during the time period that the user performed the physical activity.

9. The method of claim 1, further comprising:
    identifying, by the computing system, one or more physical activities associated with the media by applying a machine trained model to at least one of the media or metadata for the media.

10. The method of claim 1, further comprising:
    responsive to determining that the user consumed the media during the time period that the user performed the physical activity, updating, by the computing system, based on the media consumed by the user during the time period that the user performed the physical activity, a machine-trained model that identifies fitness media.

11. The method of claim 5, wherein outputting the graphical user interface prompting the user to confirm whether the user performed the second physical activity is further responsive to determining that the user was not wearing a wearable computing device that includes a motion sensor.

12. The method of claim 10, wherein the media consumed by the user includes a video viewed by the user, and wherein the machine-trained model that identifies fitness media further identifies an activity associated with the video.

13. A computing device comprising:
    at least one processor; and
    memory comprising instructions that, when executed by the at least one processor, cause the at least one processor to:
        determine a physical activity performed by a user of the computing device during a time period;
        determine whether the user consumed media during the time period that the user performed the physical activity;
        responsive to determining that the user consumed the media during the time period that the user performed the physical activity, determine, based on data indicative of the media consumed by the user, an updated physical activity performed by the user during the time period; and
        output data indicating the updated physical activity.

14. The computing device of claim 13, wherein the media consumed by the user includes a video viewed by the user, and wherein execution of the instructions causes the at least one processor to determine the updated physical activity by causing the processor to:
  determine a physical activity associated with the video viewed by the user during the time period; and
  determine that the updated physical activity performed by the user during the time period includes the physical activity associated with the video that was viewed by the user during the time period.

15. The computing device of claim 13, wherein the media consumed by the user includes a video viewed by the user, and wherein execution of the instructions causes the at least one processor to determine the updated physical activity by causing the processor to:
  determine, based on the data indicative of the media, for a plurality of portions of the media, a sub-activity performed by the user during respective portions of the plurality of portions of the media.

16. The computing device of claim 13,
  wherein execution of the instructions further causes the at least one processor to determine the physical activity performed by the user by at least causing the at least one processor to determine, based on a machine-trained model that classifies physical activities using sensor data received from a motion sensor, the physical activity performed by the user, and
  wherein execution of the instructions further causes the at least one processor to, responsive to determining the updated activity performed by the user, update, based on the sensor data and the updated activity, the machine-trained model.

17. The computing device of claim 13, wherein the time period is a first time period, the media is a first media, and the physical activity is a first physical activity, and wherein execution of the instructions further causes the at least one processor to:
  determine that the user consumed a second media during a second time period, the second media being associated with a second physical activity;
  determine whether the computing device received includes data indicating the user performed the second physical activity during the second time period;
  responsive to determining that the computing device does not include data indicating the user performing the second physical activity during the second time period, output, for display, a graphical user interface prompting the user to confirm whether the user performed the second physical activity; and
  responsive to receiving data indicating that the user performed the second physical activity, update a user profile associated with the user to indicate the user performed the second physical activity during the second time period.

18. The computing device of claim 13, wherein the computing device includes a user profile indicating, for each media of a plurality of media consumed by the user, a time period during which the user consumed the respective media, and wherein execution of the instructions causes the at least one processor to determine whether the user consumed media during the time period the user performed the physical activity by causing the at least one processor to:
  query the user profile to determine whether the user profile includes data indicating media consumed by the user during the time period that the user performed the physical activity.

19. The computing device of claim 13, wherein execution of the instructions further causes the at least one processor to:
  responsive to determining that the user consumed the media during the time period that the user performed the physical activity, update, based on the media consumed by the user during the time period that the user performed the physical activity, a machine-trained model that identifies fitness media.

20. A non-transitory computer-readable storage medium comprising instructions that, when executed by at least one processor of a computing device, cause the at least one processor to:
  determine a physical activity performed by a user of the computing device during a time period;
  determine whether the user consumed media during the time period that the user performed the physical activity;
  responsive to determining that the user consumed the media during the time period that the user performed the physical activity, determine, based on data indicative of the media consumed by the user, an updated physical activity performed by the user during the time period; and
  output data indicating the updated physical activity.

* * * * *